United States Patent
Verhagen

(10) Patent No.: US 9,799,988 B2
(45) Date of Patent: Oct. 24, 2017

(54) APPARATUS FOR ESTABLISHING AN ELECTRICAL CONTACT WITH A TARGET SURFACE

(71) Applicant: Illinois Tool Works Inc., Glenview, IL (US)

(72) Inventor: Paul Verhagen, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 66 days.

(21) Appl. No.: 14/701,804

(22) Filed: May 1, 2015

(65) Prior Publication Data

US 2016/0322743 A1 Nov. 3, 2016

(51) Int. Cl.
| | |
|---|---|
| *H01R 4/66* | (2006.01) |
| *H01R 13/62* | (2006.01) |
| *B23K 9/32* | (2006.01) |
| *B23K 9/10* | (2006.01) |
| *H01R 4/64* | (2006.01) |
| *H01R 11/30* | (2006.01) |
| *H02G 5/04* | (2006.01) |

(52) U.S. Cl.
CPC ....... *H01R 13/6205* (2013.01); *B23K 9/1006* (2013.01); *B23K 9/1043* (2013.01); *B23K 9/32* (2013.01); *H01R 4/643* (2013.01); *H01R 4/66* (2013.01); *H01R 11/30* (2013.01); *H02G 5/04* (2013.01)

(58) Field of Classification Search
CPC ....... H02G 5/04; H01R 13/6205; H01R 4/643
See application file for complete search history.

(56) References Cited

U.S. PATENT DOCUMENTS

| | | | | |
|---|---|---|---|---|
| 1,709,716 | A * | 4/1929 | Fielder ................ | H01R 11/30 219/158 |
| 2,437,633 | A * | 3/1948 | Abram ................ | H01R 11/30 439/39 |
| 2,695,942 | A * | 11/1954 | Darner ................ | H02G 5/04 15/197 |
| 2,828,472 | A * | 3/1958 | Wondriska ........... | H01R 11/30 439/38 |
| 3,518,607 | A * | 6/1970 | Reel ................... | H01R 4/643 439/40 |
| 6,283,767 | B1 * | 9/2001 | Sornes ............... | B23K 37/0426 439/100 |
| 2014/0099802 | A1 * | 4/2014 | Hicks ................. | H01R 13/6205 439/39 |

* cited by examiner

*Primary Examiner* — Tho D Ta
(74) *Attorney, Agent, or Firm* — McAndrews, Held & Malloy, Ltd.

(57) ABSTRACT

An apparatus with (a) a conformable contact member with a base and a contact layer; and (b) a magnet integral with or attached to the base, wherein, when the apparatus is placed on a target surface, the magnet and the target surface attract each other such that the contact layer is secured against the target surface.

14 Claims, 8 Drawing Sheets

APPARATUS FOR ESTABLISHING AN ELECTRICAL CONTACT WITH A TARGET SURFACE

TECHNICAL FIELD

The present disclosure relates generally to electrical connections, and more specifically to a magnetic-type apparatus for providing an electrical connection to a target surface, such as in welding.

BACKGROUND

A welding power source typically comes equipped with a pair of welding cables that form a part of a welding circuit: a work (lead) cable (also sometimes referred to as "ground cable") that connects the welding power source to a workpiece and an electrode cable that connects the welding power source to an electrode holder holding a welding electrode. During welding, current flows through the electrode cable and an arc is created between the welding electrode and the workpiece. In turn, the work cable provides a current return path to the welding power source.

Work cables are typically attached to a workpiece using work clamps (also sometimes referred to as "ground clamps"). However, present work clamps, including magnetic-type work clamps, pose challenges when used with parts having non-planar surfaces, such as pipes for instance. As one example, in order to make an electrical contact between a work clamp and an outside surface of a pipe, any non-conductive material coating on the outside surface needs to be removed from an area where the clamp is to be connected. As another example, a curvature of a pipe's surfaces can create problems in establishing an effective electrical contact with the pipe's surface. Additionally, a work clamp is often in the way of where a welder needs to work.

Some prior solutions, for instance, provide a brush-type grounding apparatus for grounding an outside surface of a pipe. However, this type of grounding apparatus typically requires a fixture and a rotating part in order to bring a brush in contact with a desired area on the pipe's outside surface.

Further, providing a good electrical contact on an inside surface of a pipe is also challenging. More particularly, an internal diameter of a pipe is typically not perfectly round and a pipe's circumference varies from part to part. This makes it difficult to establish more than a point or line of contact to a part.

SUMMARY

Disclosed herein is an apparatus that provides an increased surface contact with a target surface, such as an inside surface of a pipe, for an improved electrical connection to the target surface. Additionally, it also eliminates a need to remove a coating on the outside of a pipe in order to make an electrical contact.

In one embodiment, an apparatus for establishing an electrical contact with a target surface is disclosed. The apparatus comprises (i) a conformable contact member that conformably or substantially conformably contacts the target surface, and (ii) a magnet to removably hold that apparatus to the target surface. According to the embodiment, the magnet and the target surface attract each other such that the conformable contact member is held against the target surface.

A conformable contact member as used herein means a base and a contact layer, the base directly or indirectly carries the contact layer. The contact layer comprises an electrically conductive layer. The base is, the contact layer is, or both are conformable to enable the contact member to conform to the target surface, even when the target surface is non-planar. As can be appreciated, the more conformable the base is, the more rigid the contact layer can be. Conversely, the more rigid the base, the more conformable the contact layer should be.

As used herein, conformable means and includes flexible, deformable and/or malleable as those terms are commonly understood.

In an embodiment, the conformable contact member includes a conformable contact layer.

In an embodiment, the conformable contact layer comprises conductive bristles.

In an embodiment, the conductive bristles comprise metallic fibers.

In an embodiment, the conductive bristles comprise conductive plastic fibers.

In an embodiment, the conformable conductive layer comprises conductive strips.

In an embodiment, the conformable conductive layer comprises a conductive wool.

In an embodiment, there is disclosed an apparatus, comprising: (a) a base having bristles made of an electrically conductive material; and (b) a magnet integral with or attached to the base, wherein, when the apparatus is placed on a target surface, the magnet and the target surface attract each other such that the bristles are secured against the target surface.

In an embodiment, the bristles are flexible so that when the target surface is curved all of the bristles are electrically conductive with the target surface.

In an embodiment, the bristles are flexible so that when the target surface is concave all of the bristles are electrically conductive with the target surface.

In an embodiment, the bristles are flexible so that when the target surface is concave, at least half of the bristles contact the target surface.

In an embodiment, the apparatus includes a terminal to which a cable or wire can be secured.

In an embodiment, the base has an aperture, the apparatus further comprises a stem, a portion of which protrudes through the aperture in the base, and the protruding portion of the stem functions as the terminal.

In an embodiment, the stem is attached to or integrated with the magnet.

In an embodiment, the magnet has an aperture through which the stem extends.

In an embodiment, the base has a circular periphery.

In an embodiment, the bristles are positioned within a ring within the periphery of the base.

There is also disclosed an apparatus comprising (a) at least one conformable contact member with a base and a contract layer; (b) at least one magnet; and (c) a moveable housing that holds the at least one conformable contact member and the at least one magnet, wherein, when the apparatus is placed on a target surface, the at least one magnet and the target surface attract each other such that each contact layer is secured against the target surface.

In an embodiment, the movable housing includes a plurality of wheels.

In an embodiment, the housing has at least a first side, a second side, and a top; the plurality of wheels include a first plurality of wheels attached to the first side and a second plurality of wheels attached to the second side; the at least one brush is mounted to the top of the housing; the at least one magnet includes a first magnet and a second magnet, and the first magnet being attached to an inside surface of the first side and the second magnet being attached to an inside surface of the second side.

In an embodiment, the at least one magnet is positioned such that a predetermined gap exists between the target surface and a bottom surface of the at least one magnet.

In an embodiment, the apparatus further comprises an adjustable member coupled to the at least one base, the adjustable member allowing for a position of the base to be adjusted with respect to the target surface.

In an embodiment, the apparatus has a terminal for electrical connections thereto.

There is also disclosed a welding system, comprising (a) a power source with a power terminal and a return terminal; (b) a grounding apparatus comprising (i) a conformable contact member with a base and a contact and (ii) a magnet integral with or attached to the base; and (c) a cable to electrically connect the grounding apparatus and the return terminal.

Additional features and advantages of embodiments will be set forth in the description, which follows, and in part will be apparent from the description.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
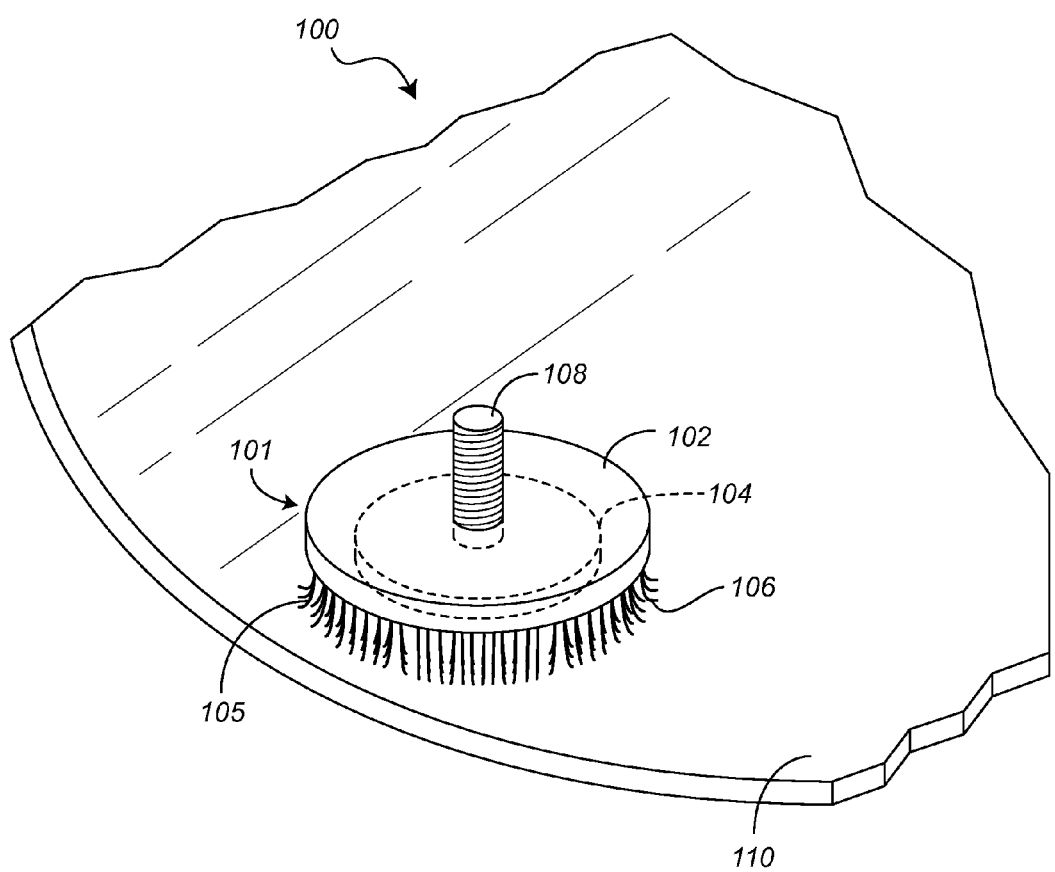
FIG. 1 illustrates an apparatus for establishing an electrical contact with a target surface in accordance with a first exemplary embodiment of the present disclosure.

The present disclosure is herein described in detail with reference to embodiments illustrated in the drawings, which form a part hereof. Other embodiments may be used and/or other changes may be made without departing from the spirit or scope of the present disclosure. The exemplary embodiments described in the detailed description are not meant to be limiting of the subject matter presented herein.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the present disclosure.

Referring to FIG. 1, a basic apparatus 100 for establishing an electrical contact with a target surface 110 in accordance with a first exemplary embodiment of the present disclosure is shown. The apparatus 100 can include a conformable contact member 101 comprised of a base 102 and a contact layer 105 which is comprised of a plurality bristles 106 made of an electrically conductive material. The base 102 may be round-shaped, as shown, or it can take on different form(s). The apparatus 100 further can comprise an electrical connection interface in the form of a bolt (or stem) 108 to facilitate connecting the apparatus 100 to a desired endpoint. The apparatus 100 is disposed with the bristles 106 in contact with the target surface 110. The target surface 110 may be a non-planar (e.g., curved) surface (e.g., an inside or outside surface of a pipe), as shown in FIG. 1, or a planar surface. It can be appreciated that a curved surface such as that on the inside of a pipe is a concave surface.

As also illustrated, a magnet 104 is secured to the base 102 to thereby secure the bristles 106 against the target surface 110.

As mentioned above, the base 102 and/or the contact layer 105 can be conformable to enable the conformable member 101 to conform to the contour of the target surface 110. In FIG. 1, the bristles 106 provide at least a conformable contact layer 105. But, the base 102 and bristles 106 should be understood to represent all types of bases and contact layers that can be used in accordance with the invention(s) disclosed herein.

Note that, as used herein, the term "bristle" generally refers to any bristle-like member, i.e., a member that is relatively short and stiff but which can be bent with relative ease without breaking. Preferably, the bristles are resilient and can be bent many times without permanent deformation. Thus, the bristles and base form a brush-like device, preferably a wire brush-like device.

However, other conformable contact layers that might be used include, conductive strips or webs, squeezable or malleable pads made of conductive fibers, wool bundles such as steel wool bundles, and sponges made of conductive material. Conductive materials include metallic fibers, conductive plastics and carbon fibers, to name a few. Depending upon the material, a thicker contact layer should wear, at least as long, if not longer, than a thinner contact layer.

Conformable bases include members (a) that are inherently conformable due to, e.g., the material of which they are made, such as pliable or bendable rubber, pliable or bendable plastic or sufficiently thin layers that allow for bending, or (b) that are flexible due to the inclusion of flexure regions such as, e.g., hinges (living or otherwise) or bendable members such as sufficiently thin members such as webs.

Figure 11:
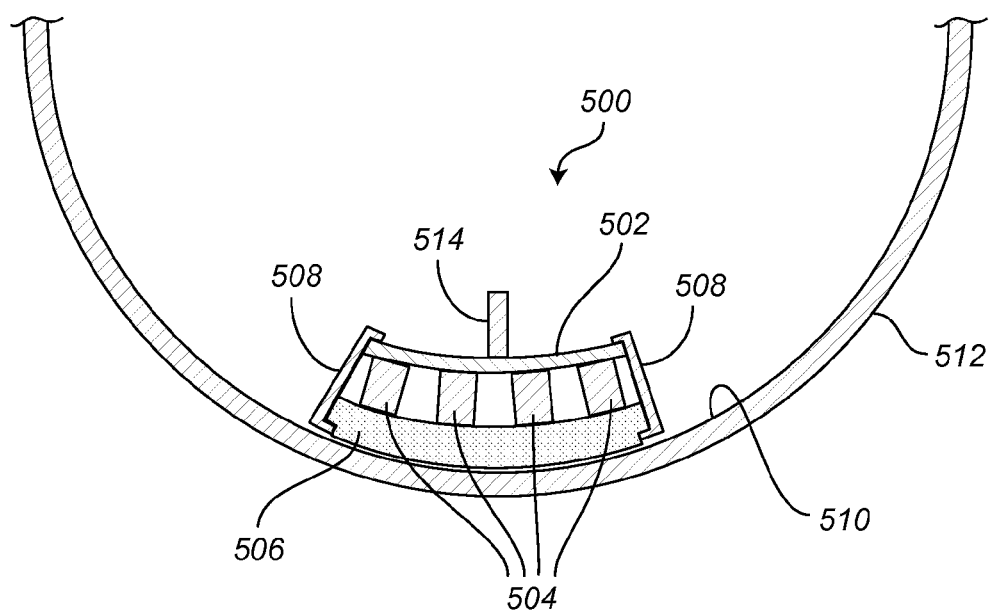
FIG. 11 illustrates in cross section aspects of the invention.

Further, the magnet 104 can be understood to be representative of one or more magnets. As an example, with reference to FIG. 11, a base 102 could be a flexible (thus conformable) thin metal plate to which a plurality of parallel magnets 504 are attached. A conformable contact layer 114 in the form of an pad or sponge made of a conductive material such as very dense steel wool could be attached to the magnets by way of metallic clips 116. A suitable stem or terminal 118 could be attached to the base 102. In this arrangement the magnets 504 could move apart or together when the apparatus is secured to a concave or convex surface, respectively, thus allowing the contact layer to expand or contract, respectively, to curve. In FIG. 11, the surface 510 is concave, so the pad as stretched as the apparatus is attracted to the surface 510.

In the apparatus 100, with the magnet 104 being secured to the base 102, the magnet 104 and the target surface 110 attract each other such that the bristles 106 are secured or held against the target surface 110. Further, the apparatus 100 can be electrically connected to a given endpoint/node (e.g., a return terminal on a welding power source) via the bolt 108. In this regard, the apparatus 100 is configured such that, when connected, an electrical connection exists between the bristles 106 and the given endpoint. When the bristles 106 are secured against the target surface 110 that is electrically conductive, an electrical connection is, in turn, established between the target surface 110 and the given endpoint.

In this regard, the magnet 104 and its properties (e.g., its size, type, magnetic strength (or "pull" force), etc.) may be selected and/or configured accordingly so that a sufficient magnetic attraction develops between the magnet 104 and the target surface 110 to keep the bristles 106 secured against the target surface. In turn, the target surface 110 will be made of a suitable material that will be attracted to the magnet 104 when the magnet 104 is in a proximity of the target surface 110. Such material may include a suitable ferromagnetic metal or metal alloy.

It can be appreciated that the magnetic attraction between the magnet 104 and the target surface 110 preferably is such that it can be overpowered by human force. In this way, a human, for example a welder, can easily pick up the apparatus 100 and move it to another location, or drag the apparatus 100 to another location. In this sense, the apparatus 100 is removably secured by the magnet 104 to the target surface 110.

Figure 2:
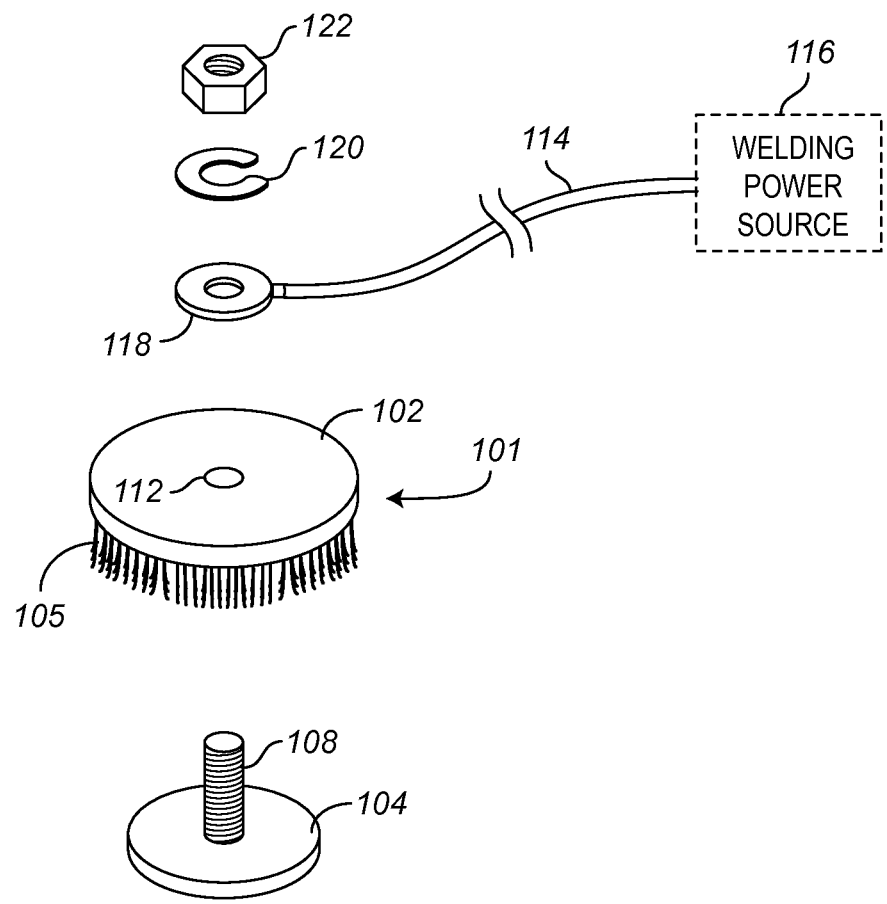
FIG. 2 illustrates the apparatus of FIG. 1 in greater detail.

FIG. 2 shows one version of the apparatus 100 in greater detail. In this version, the bolt 108 is an integral part of the magnet 104, that is, the bolt 108 cannot be separated from the magnet or is permanently secured thereto. Further, the magnet 104 is external to the base 102 and coupled with the base 102 via the bolt 108. However, in an alternate version, the magnet 104 may be internal to the base 102, such as being built into a housing of the base 102.

Further, each of the bristles 106 has one end part embedded in the base 102, which itself is made of a conductive material. A center portion of the base 102 is bristle free so that the magnet 104 can be coupled with the base 102 within this bristle-free area. The bristles 106 then are positioned within a ring within a periphery of the base 102. Although not shown, it is understood that the bristles may also protrude through the base, not just end in the base. The stud 108 may be attached to the base 102 and the magnet could be a ring allowing bristles to be positioned inside the ring as well as described below in connection with FIG. 10.

As shown in FIG. 2, an aperture 112 through which the bolt 108 can extend is provided in the base 102. When the bolt 108 is inserted through the aperture 112, a portion of the bolt 108 will protrude through the aperture 114 to provide a terminal to which a lead (e.g., a cable, wire, etc.) can be secured. This way, a cable or another part can be connected to the apparatus 100 via the protruding portion of the bolt 108.

For example, as noted above, a typical welding power source includes a work cable attached to a workpiece through a clamp to form a welding circuit. To illustrate, as shown in FIG. 2, a work cable 114 may be electrically connected to a welding, cutting or heating power source 116. The work cable 114 has an electrical terminal 118. In the example of FIG. 2, the electrical terminal 118 is in the form of a ring terminal, which has an opening such that the terminal 118 can fit over the bolt 108. In addition, a washer 120 and a nut (or locknut) 122 can be used to secure the work cable 114 against the base 102.

More specifically, if the bolt 108 is threaded, the nut 122 can be threadingly received thereon via the washer 120 and tightened. When so tightened, the nut 122 secures the electrical terminal 118 of the work cable 114 against the base 102. In turn, the magnet 104 is secured against the base 102. With this configuration, when the apparatus 100 is connected to the work cable 114, it is possible to electrically interconnect the welding power source 116 and the bristles 106.

Advantageously, the apparatus 100 can provide an electrical connection from the welding power source 116 to the target surface 110 of workpiece, such as in a welding of a pipe. Further, since the bristles 106 are secured against the target surface 110 by a magnetic attraction between the target surface 110 and the magnet 104, no fixture is necessary to keep the bristles 106 in contact with the target surface 110. In addition, the bristles 106 can provide an increased contact area with the target surface 110, such as an inside surface of a pipe, for an improved electrical contact.

In general, an electrical connection between the work cable 114 (and thus the welding power source 116) and the bristles 106 can be established in various ways. In one example, the entire base 102 may be made of electrically conductive material(s). In this case, when the electrical terminal 118 of the work cable 114 is secured against the base 102, an electrical connection may be established between the work cable 114 and the bristles 106. Similarly, if the bolt 108 is also made of a conductive material (like the base 102 and the bristles 106 embedded therein), then the bristles 106 become electrically coupled to the bolt 108 via the base 102 due to a contact between the bolt 108 and an inner wall of the aperture 112 in the base 102.

Alternatively, it may be sufficient for at least an outer surface of the base 102 against which the work cable 116 is secured to be electrically conductive. If the base 102 is configured such that bristles 106 are electrically connected to such surface, an electrical connection may be made between the work cable 116 and the bristles 106. In this example, the bolt 108 may be electrically conductive or non-conductive.

In another example, the base 102 may include an electrically conductive member (e.g., a plate or a ring) that carries the bristles 106 and is encased in or otherwise attached to a non-conductive housing. If the bolt 108 is electrically conductive and contacts the conductive member (or other portion of the base 102 electrically connected to the conductive member) via the aperture 112, an electrical connection may be established between the work cable 114 and the bristles 106.

However, the above examples are not limiting and other way(s) of establishing an electrical connection with the bristles 106 may be possible as well. Similarly, other way(s) of configuring the apparatus 100 may be possible as well.

In addition, it should be understood, that there could be an intermediate contact between the apparatus 100 and the work cable. This would enable the work cable to remain connected to the intermediary contact when the apparatus with the conformable contact member is, e.g., changed out.

In addition, various arrangements for securing the contact layer and the base together are discussed above. However, it should be understood that other arrangements include use of screws to screw the contact layer onto the base, plural bolts to bolt the contact layer and base together, one or more clips to clip the contact layer to the base, adhesive to adhere the contact layer to the base, hook and loop layers and/or magnets to secure the contact layer to the base, to mention a few. The attachment arrangement will depend on at least the suitability of the attachment arrangement for the application, the type of base used, the type of contact layer used. These arrangement are easily understood by those of ordinary skill in the art.

Figure 3:
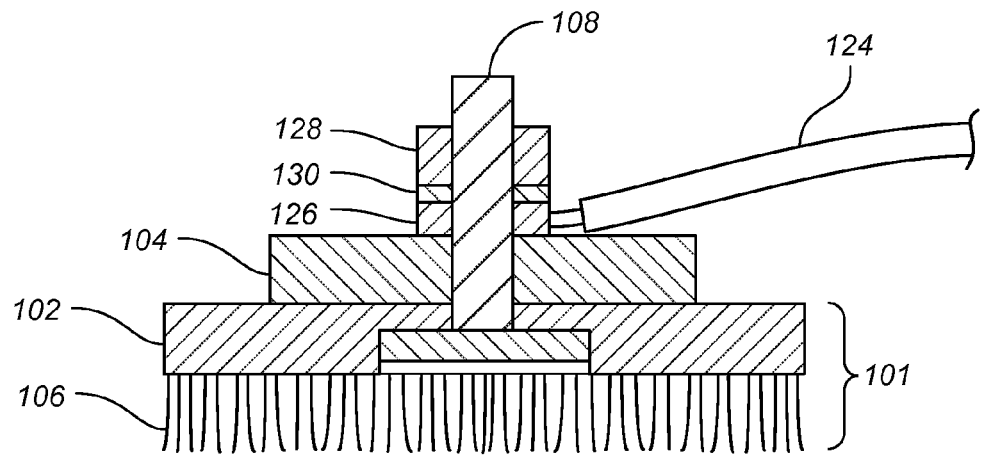
FIG. 3 illustrates in cross section one configuration embodying principles of the first exemplary embodiment.

To illustrate, FIG. 3 depicts a cross-sectional view one configuration embodying principles of the first exemplary embodiment. In this configuration, the magnet 104 is positioned over the base 102, between a lead 124 providing an electrical connection to a given endpoint/node (e.g., a work cable) and the base 102. In the arrangement of FIG. 3, the bolt 108 is embedded in the base 102 and extends through the magnet 104, such via an aperture in the base 102 and the magnet 104. In turn, an electrical terminal 126 of the lead 124 fits over the bolt 108. The terminal 126 can be, for instance, in the form of a ring or hook terminal.

In this configuration, if the bolt 108 is threaded, a nut 128 can be threadingly received thereon via a washer 130 and tightened. When so tightened, the nut 128 secures the lead 124 against the magnet 104. In turn, the magnet 104 is secured against the base 102. If, for example, the bolt 108 and the base 102 are both made of a conductive material, an electrical connection exists between the lead 124 and the bristles 106 via the base 102, the bolt 108, and the terminal 126.

Figure 4:
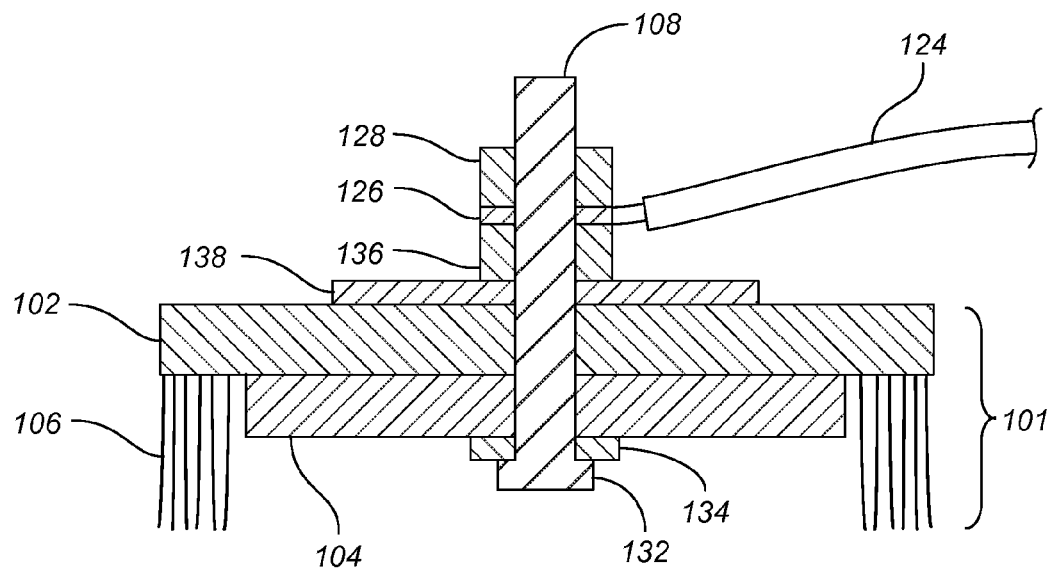
FIG. 4 illustrates in cross section another configuration of an apparatus embodying principles of the first exemplary embodiment.

FIG. 4 illustrates a cross-sectional view of another configuration embodying principles of the first exemplary embodiment. In this configuration, the bolt 108 is separate from both the base 102 and the magnet 104. Each of the base 102 and the magnet 104 has a respective aperture through which the bolt 108 can be inserted. When so inserted, the base 102 and the magnet 104 can be coupled together by securing the bolt 108.

In particular, the bolt 108 can be secured to the base 102 via a nut 136 and a washer 138. In turn, the bolt 108 can be secured to the magnet 104 via a nut 132 and a washer 134. In turn, the electrical terminal 126 can be secured to the nut 136 via the nut 128 and the washer 130, as in FIG. 3. Similar to FIG. 3, an electrical connection is established between the lead 124 and the bristles 106 via the base 102, the bolt 108, and the terminal 126.

Figure 5:
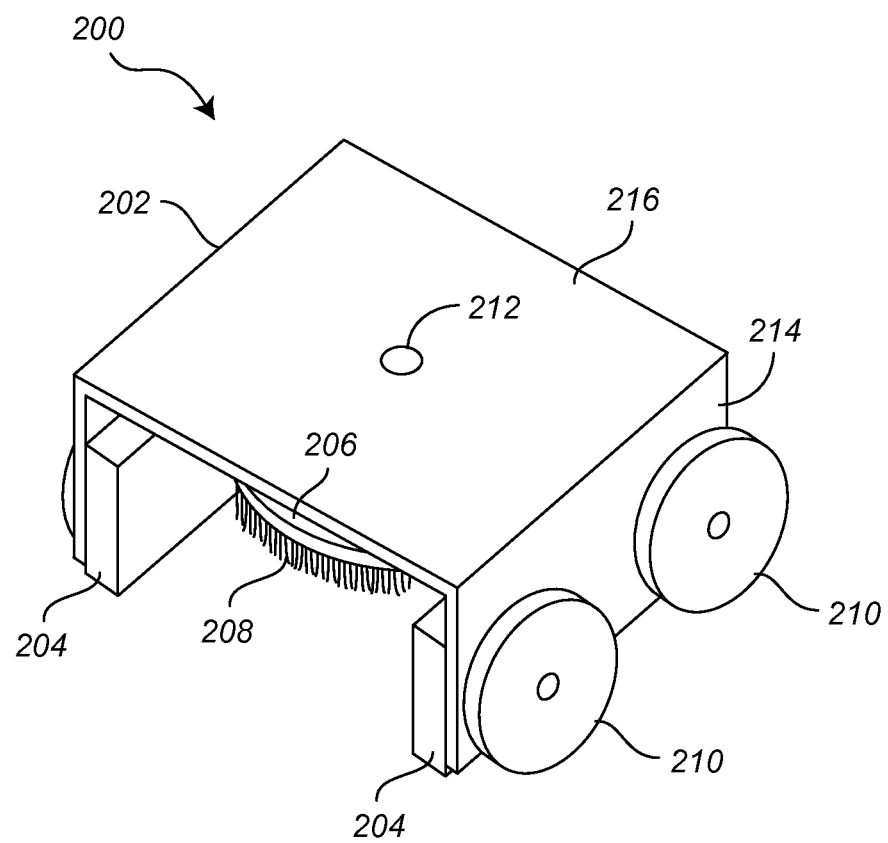
FIG. 5 illustrates an apparatus for establishing an electrical contact with a target surface in accordance with a second exemplary embodiment of the present disclosure.

Referring now to FIG. 5, an apparatus 200 for establishing an electrical contact with a target surface in accordance with a second exemplary embodiment of the present disclosure is shown. In contrast to the apparatus 100, the apparatus 200 is a more moveable apparatus that can travel or translate along a target surface. As shown in FIG. 5, the apparatus 200 comprises a moveable housing 202 that includes a plurality of wheels 210 and holds one or more magnets 204 and a base 206. The base 206 includes a plurality bristles 208 made of an electrically conductive material much as described above in connection with the first exemplary embodiment.

As shown in FIG. 5, the apparatus 200 preferably includes two magnets 204, each attached to an inside surface of a respective side 214 of the apparatus 200. However, the apparatus 200 may include more or fewer magnets 204 than shown. Each of the magnets 204 may be attached to the housing 202 via any suitable means, such as via bolts, magnetic attraction, adhesive, and/or other means.

Figure 6:
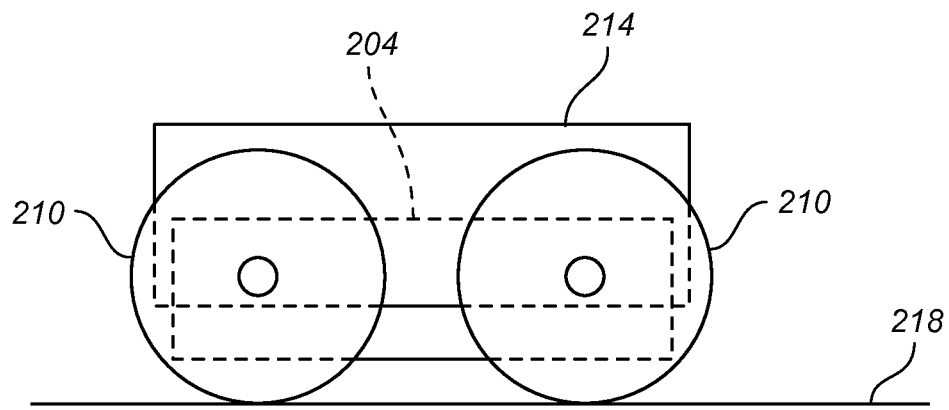
FIG. 6 illustrates a side view of the apparatus of FIG. 5.

Referring to FIG. 6, depicting a side view of the apparatus 200, the wheels 210 are provided on the outside of the housing 202, with two of the wheels 210 being attached to each respective side 214. However, fewer or more wheels 210 can be used instead. The wheels 210 may be attached to the housing 202 via any suitable means (e.g., via an axial bearing attached to the housing 202) that allows the wheel 210 to rotate properly. Each of the wheels 210 may be configured accordingly so as to facilitate movement on a target surface 218. For example, the wheel may be made of any suitable materials such as rubber, plastic, metal component(s), fibers and/or glass. Indeed, the wheels could be made of a magnetic material thereby eliminating the need for magnets 204, or supplementing magnets 204.

In accordance with the second embodiment, the wheels 210 allow the apparatus 200 to travel (or translate) along the target surface 218. As in the first embodiment, the target surface 110 may be a planar surface or a non-planar (e.g., curved) surface, such as an inside surface of a pipe. Additionally, the wheels 210 keep the magnets 204 from touching the target surface 218.

Figure 7:
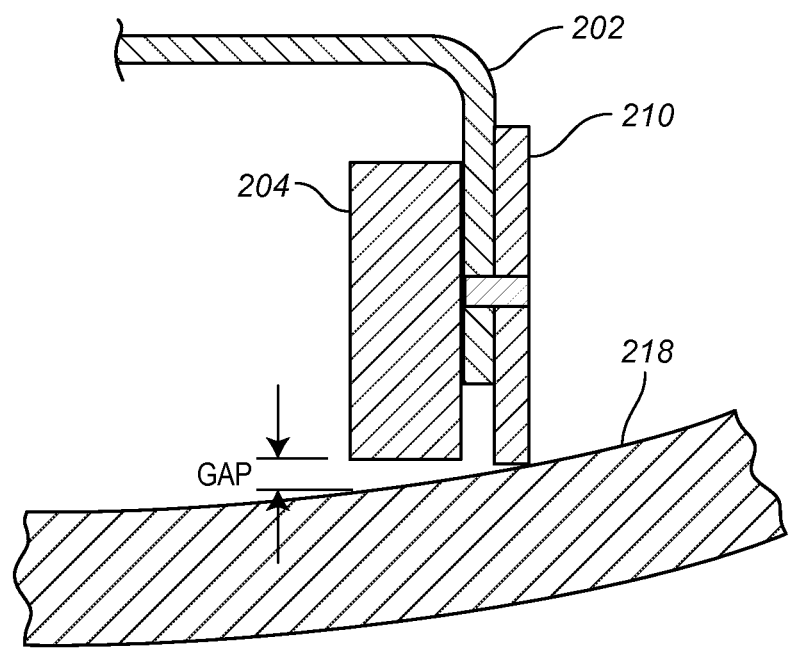
FIG. 7 illustrates a partial cross sectional view of the apparatus of FIG. 5.

In particular, as shown in FIG. 7, each of the magnets 204 is positioned such that a predetermined gap exists between the target surface 218 and a respective bottom surface of each of the magnets 204. Although the magnets 204 are illustrated as functioning separately, the magnets 204 could be polarized and use the frame 202 as a flux concentrator so that one magnet has a north pole toward the target surface 218 and the opposite magnet 204 has a south pole facing the target surface. The predetermined gap may be such that there is a clearance between each magnet 204 and the target surface 218, while the magnets 204 provide the necessary force to keep the bristles 208 in contact with the target surface 218. Namely, the magnets 204 and the target surface 218 attract each other such that the plurality of bristles 208 are secured against the target surface 218.

As in the first embodiment, each of the magnets 204 and its properties (e.g., its size, type, magnetic strength (or "pull" force), etc.) may be selected and/or configured accordingly so that a sufficient magnetic attraction develops between the magnets 204 and the target surface 218 to keep the bristles 208 secured against the target surface 218. In turn, the target surface 218 will be made of a suitable material that will be attracted to the magnets 204 when the magnets 204 are in a proximity of the target surface 218. Such material may include a suitable ferromagnetic metal or metal alloy.

Figure 8:
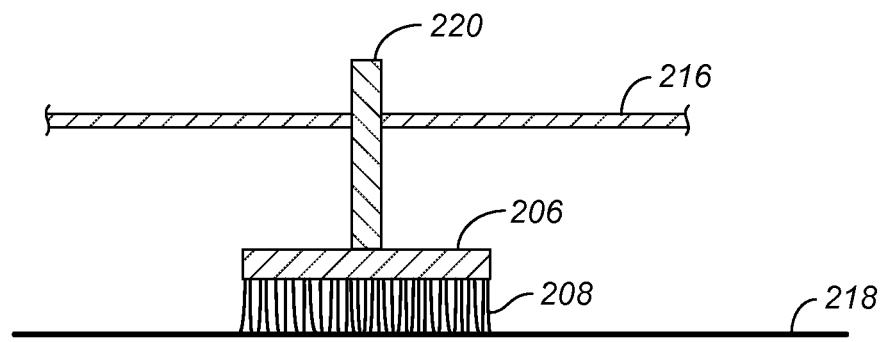
FIG. 8 illustrates another partial cross sectional view of the apparatus of FIG. 5.

FIG. 8 illustrates a partial cross sectional view of the apparatus 200, showing the base 206 in greater detail. As shown in FIG. 6, the base 206 is mounted to a top 216 of the housing 202 and faces an inside of the housing 202. Although only one base 206 is shown, the apparatus 200 may include more than one base 206.

The base 206 may be attached to the housing 202 via an adjustable member 220 that would allow for adjusting a position of the base 206 (and thus the bristles 208) with respect to the target surface 220. This feature allows the apparatus 200 to be used on the inside of parts with multiple different internal diameters (e.g., pipes). In particular, the position of the base 206 could be adjusted accordingly to adapt to various internal diameters to bring the bristles 208 in contact with the target surface 218.

In one example, the adjustable member 220 could be a threaded member attached to or integrated with the base 206. As shown in FIG. 5, the housing 202 may include an aperture 212 (as shown in FIG. 5). Such aperture could have internal threads that would allow the adjustable member 220 to be screwed in and out to raise or lower the position of the base 206. The position of the adjustable member 220 could be fixed by securing the adjustable member 220 with any suitable means.

However, other way(s) of configuring the adjustable member 220 and/or a manner in which the position of the base 206 could be adjusted may be possible as well. Alternatively, the base 206 may be fixed in one position and mounted to the housing 202 via any suitable means.

The apparatus 200 may be connected to a desired endpoint/node (e.g., a return terminal on a welding power source) in a similar manner as in the first exemplary embodiment. More particularly, as shown in FIG. 8, the adjustable member 220 may be configured such that a portion of the adjustable member 220 protrudes through the aperture 212. This way, a cable (e.g., a welding cable) or another part can be connected to the apparatus 200 via the protruding portion of the adjustable member 220. The cable can be secured against the housing 202 in a similar way as in the first embodiment.

However, the above example is provided for exemplary purposes only and other way(s) of configuring/providing an electrical connection to the apparatus 200 are possible as well. Additionally, establishing an electrical connection with the bristles 208 may be accomplished in various ways via the housing 202, the base 206, and/or adjustable member 220, such as using the concepts discussed above with respect to the first exemplary embodiment.

Similar to the first exemplary embodiment, in the apparatus 200, the magnets 204 and the target surface 218 attract each other such that the bristles 208 are secured or held against the target surface 218. Further, the apparatus 200 can be electrically connected to a given endpoint/node (e.g., a return terminal on a welding power source) such that, when connected, an electrical connection exists between the bristles 208 and the given endpoint. When the bristles 208 are secured against the target surface 218 that is electrically conductive, an electrical connection is, in turn, established between the target surface 218 and the bristles 208. This way, one can provide an electrical connection from the given endpoint to the target surface 218 via the bristles 208.

Additionally, with a benefit of the second embodiment, the apparatus 200 can travel along the target surface 218 so that it can be moved from one area to another area of a part. Further, when the housing 202 is not moving, the housing 202 can remain stationary with respect to the target surface 218 by way of magnetic attraction between the magnets 204 and the target surface 218.

Figure 9:
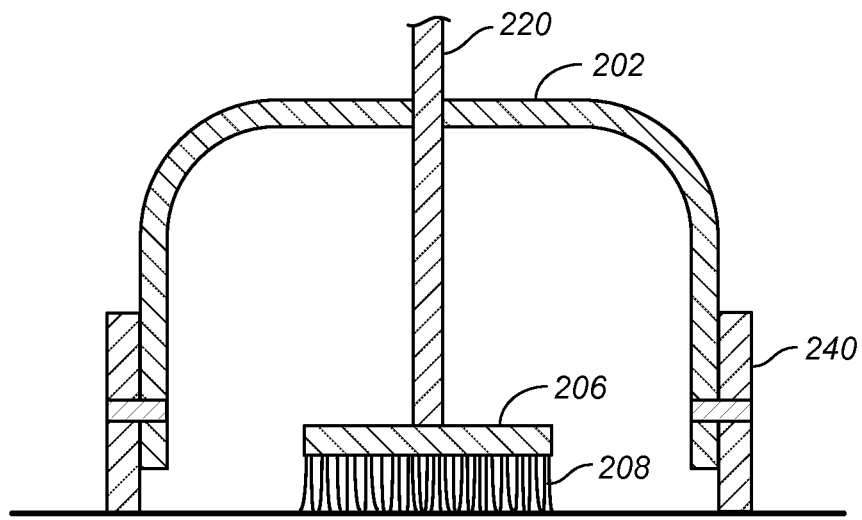
FIG. 9 illustrates a cross sectional view of a variation of the second exemplary embodiment.

In FIG. 9, another variation of the second embodiment is illustrated in partial cross sectional view. In this variation, either wheels 240 are magnetic, as mentioned above, or the base 206 incorporates a magnet therein in a manner similar to those discussed above in connection with the first embodiment, or both. In this way, the cart comprised of the housing 202 and the wheels 240 can be simplified.

It can be appreciated, that while the various brushes or bristle carrying bases have been described as having circular peripheries (i.e., as viewed in plan view), the peripheries could be of any suitable shape, such as, e.g., rectangular or polygonal. The main need is to use a conformable contact member in which there is sufficient conformability and in which sufficient electrical contact for the amperages involved can be obtained.

Figure 10:
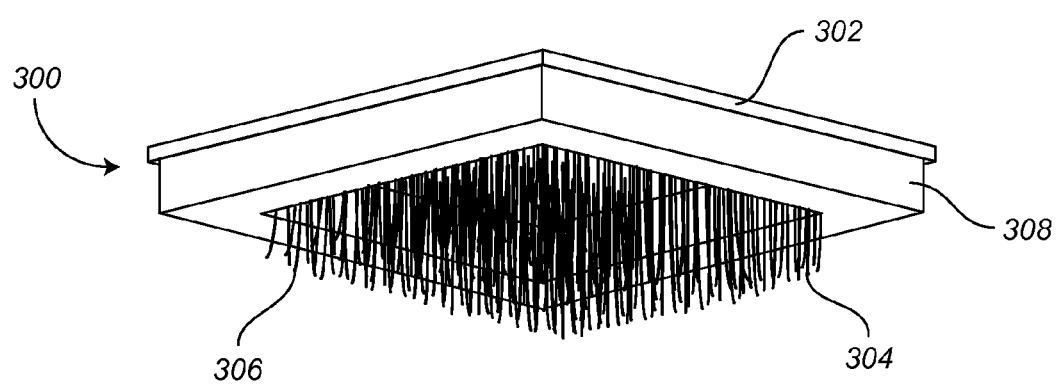
FIG. 10 illustrates a perspective view further variations of the first exemplary embodiment.

In that regard, referring to FIG. 10, in yet further variations to the first exemplary embodiment, a conformable contact member 300 includes a rectangular-shaped base 302. Preferably, a rectangular base 302 is square, as illustrated. Positioned within a central rectangular area is a contact layer 304 comprised of metallic bristles 306. A rectangular magnetic ring 308 positioned at the outer edge portion of the base 302.

As such, FIG. 10 serves to illustrate that the base can be of different shapes, that the magnetic member can be a ring, and that the bristles need not be outside of the magnetic member, but can be within the ring. Whether the bristles 306 terminate in the base 302 or extend therethrough is not illustrated, but these different arrangements are understood from the descriptions above.

Additionally, in FIG. 11 there is further illustrated an apparatus 500 in which a conformable base is provided, together with a conformable contact layer. As illustrated, the apparatus includes a thin metal plate as a base 502 to which are attached a plurality of spaced-apart parallel magnets 504. A contact layer 506, made of, e.g., a very dense steel wool, is secured to the magnet 504, by way of, e.g. an adhesive. Metallic clips 508 are used to electrically connect the contact layer 506 and the base 502. Because the magnets 506 equally attract to the concave interior surface 510 of a pipe 512, the pad 506 is caused to stretch as the magnets move apart alone their respective radial anchoring positions. At the same time, the base 502 flexes to accommodate the movement of the magnets 504. A terminal or stem 514 provides an electrical connection point for a work cable.

While various aspects and embodiments have been disclosed, other aspects and embodiments are contemplated. The various aspects and embodiments disclosed are for purposes of illustration and are not intended to be limiting, with the true scope and spirit being indicated by the following claims. For example, although the foregoing examples have been illustrated primarily in the context of welding applications, the principles of the present disclosure may be used in other applications that need establishing an improved electrical contact with a target surface.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. An apparatus, comprising:
    a conformable contact member comprising a base and a conformable contact layer, the conformable contact layer including a plurality of electrically conductive and flexible bristles
    positioned within a periphery of the base; and
    a magnet integral with or attached to the base, wherein, when the apparatus is placed on a target surface, the magnet and the target surface attract each other such that the bristles are in contact with the target surface.

2. The apparatus of claim 1, wherein the base is a conformable base.

3. The apparatus of claim 1, wherein the base has a circular periphery.

4. The apparatus of claim 1, wherein the apparatus has a terminal for electrical connections thereto.

5. An apparatus, comprising:
at least one conformable contact member comprised of a base and a contact layer;
at least one magnet; and
a moveable housing comprising a plurality of wheels and configured to hold the at least one contact member and the at least one magnet, wherein:
the housing has at least a first side, a second side, and a top,
the plurality of wheels include a first plurality of wheels attached to the first side and a second plurality of wheels attached to the second side,
the at least one conformable contact member is mounted to the housing,
the at least one magnet is attached to at least one of a surface of the first side or a surface of the second side, and
when the apparatus is placed on a target surface, the at least one magnet and target surface attract each other such that the contact layer is secured against the target surface.

6. The apparatus of claim 5, wherein the at least one magnet is positioned such that a predetermined gap exists between the target surface and a bottom surface of the at least one magnet.

7. The apparatus of claim 5, wherein the at least one magnet comprises a first magnet attached to the surface of the first side and a second magnet attached to the surface of the second side.

8. The apparatus of claim 5, wherein the surface of the first side is an inside surface of the first side or an outside surface of the first side.

9. An apparatus, comprising:
at least one conformable contact member comprised of a base and a contact layer;
at least one magnet;
a moveable housing that holds the at least one contact member and the at least one magnet; and
an adjustable member coupled to the base, the adjustable member allowing for a position of the base to be adjusted with respect to a target surface wherein,
when the apparatus is placed on the target surface, the at least one magnet and the target surface attract each other such that the each contact layer is secured against the target surface.

10. The apparatus of claim 9, wherein the conformable contact member comprises bristles that are flexible so that when the target surface is curved the bristles are electrically conductive with the target surface.

11. The apparatus of claim 10, wherein the bristles are flexible so that when the target surface is concave the bristles are electrically conductive with the target surface.

12. The apparatus of claim 10, wherein the bristles are flexible so that when the target surface is concave, at least half of the bristles contact the target surface.

13. The apparatus of claim 9, wherein the base has an aperture and
a stem protrudes through the aperture in the base.

14. The apparatus of claim 13, wherein the stem is attached to or integrated with the magnet.

* * * * *